R. V. CHEATHAM.
AUTOMATIC SWITCH FOR TROLLEY ROADS.
APPLICATION FILED SEPT. 2, 1913.
1,083,431.
Patented Jan. 6, 1914.
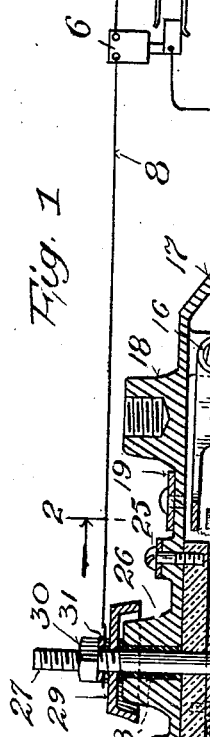
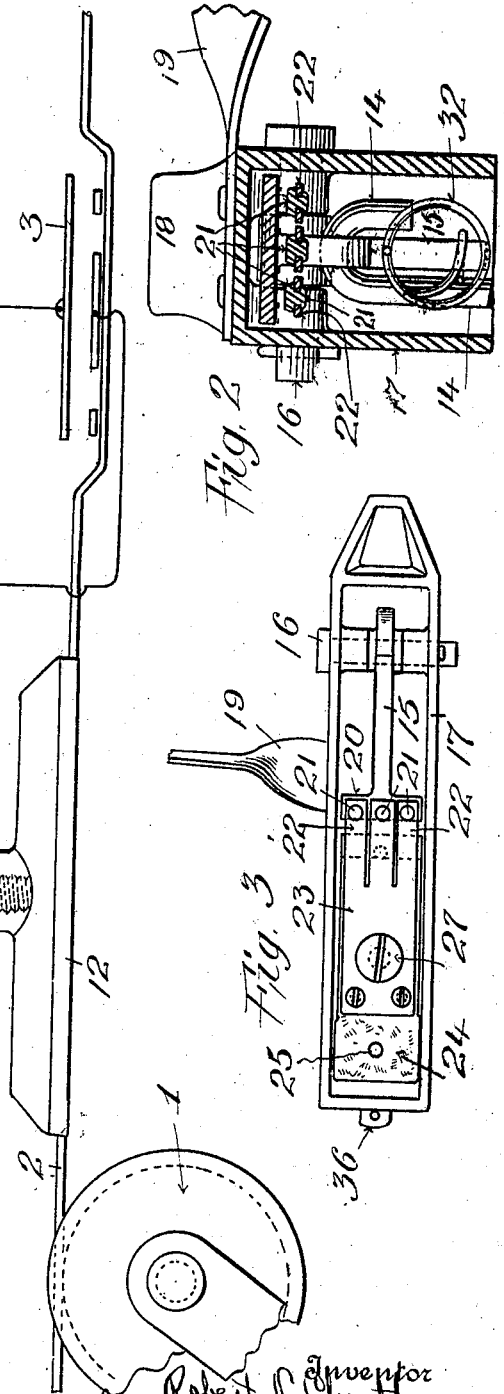
Witnesses:
Inventor
Robert V. Cheatham
By his Attorney

UNITED STATES PATENT OFFICE.

ROBERT V. CHEATHAM, OF ST. MATTHEWS, KENTUCKY.

AUTOMATIC SWITCH FOR TROLLEY-ROADS.

1,083,431.

Specification of Letters Patent.

Patented Jan. 6, 1914.

Application filed September 2, 1913. Serial No. 787,826.

*To all whom it may concern:*

Be it known that I, ROBERT V. CHEATHAM, a citizen of the United States, and a resident of St. Matthews, county of Jefferson, and State of Kentucky, have invented a new and useful Improvement in Automatic Switches for Trolley-Roads, of which the following is a specification.

In several former patents of mine, some of which are numbered 612,702, 696,313, 787,827 and 917,531, respectively, I have shown, described and claimed various forms of automatic electric switches for trolley roads, which, when in use, are controlled by the motorman, so that if he is to go straight ahead he leaves power off his motor at the critical place, and if he wishes to take the curve he leaves power on his motor, when the apparatus is as hereinafter described. This apparatus is suitable for ordinary conditions where single cars are run, but where cars are run in trains with several trolley wheels on the trolley wires, difficulties are encountered, because at times one car may be switched one way and another car another way, as the motorman is unable to tell just when the cars are at the critical place, and so throws his power on or off the motor at an improper time.

The object of my invention is to make impossible an accident of this character by rendering the switch-throwing device inoperative as long as a train of cars with trolley wheels is adjacent to the critical part of the trolley wire or track.

A further object is to prevent a second car from interfering with a car taking the switch.

These objects are accomplished by my invention, one embodiment of which is hereinafter set forth.

For a more particular description of my invention, reference is to be had to the accompanying drawing, forming a part hereof, in which—

Figure 1 is a diagrammatic view, partially in detail section, of my improved device. Fig. 2 is a sectional view, taken on the line 2—2 of Fig. 1, looking in the direction of the arrows. Fig. 3 is an inverted plan view of the trolley switch, with parts removed.

Throughout the various views of the drawings, similar reference characters designate similar parts.

The old part of my invention which is shown in each of my said patents, in one form or another, comprises the trolley wheel 1, trolley wire 2, trolley pan 3, double solenoid 4, ground connection for the double solenoid 5, and a relay 6, which is sometimes termed a circuit controller, the magnet of which is connected by one wire 7 to the trolley pan 3, and by another wire 8 to the trolley wire 2, and the armature of which is connected by one wire 9 to the trolley pan 3, and by two wires 10 and 11 to the respective coils of the double solenoid 4. In the particular embodiment of my invention hereinafter set forth in detail, the novelty resides in the connection between the wire 8 and the trolley wire 2, which connection I will now describe.

The trolley wire 2 carries an ear 12 of the conventional kind, such as is commonly used for supporting a trolley wire, and this is secured to a suitable eyelet bolt 13 in the conventional manner. This eyelet bolt 13 is connected by a suitable link 14 to a bell crank lever 15 which is fulcrumed at 16 in a suitable hood 17 that is supported from span wires, not shown, by means of an eyebolt, not shown, adapted to be secured in a suitable projection 18, and this hood 17 is further steadied by means of a suitable bar 19 which extends a short distance so that it may be secured to a suitable means for holding the hood in its proper upright position. It is preferable to have this projection 19 close to the projection 18 and the eye-bolt in the projection 18 substantially over the link 14 when the apparatus is used.

The free end of the lever 15 is enlarged at 20 so as to rest on any of the lugs 21 of the fingers 22 of the spring plate 23 which is secured to the insulation 24 on the underside of the hood by screws, or in any other suitable manner. This insulation is secured by another set of screws 25 in the manner shown, or in any other desired way, so that this insulation 24 is always fixed on the interior of the hood and close to its upper surface where it will be dry and free from all influences that would tend to short circuit the plate 23 which is carefully insulated from the hood 17. This hood 17 is provided with an upwardly extending boss 26 which surrounds a suitable bolt 27 which is carefully insulated from the hood 17, and connected to the plate 23. The insulation between the boss 26 and the bolt 27 may be an air gap, or it may be a sleeve 28 of insulating material. In any event, this insulation is carefully protected by a hood 29 mounted on the bolt 27 and placed in a suitable position by means of a nut 30 and washers 31, which washers engage the wire 8 and hold the same. The lower end of the bell crank lever 15 has a perforation through which passes one end of a coiled spring 32, the other end being secured to a nut 33 on the bolt 34, which is held in any suitable manner, but is preferably held against rotation by means of a pin 35 passing the head of the bolt 34, and also through a projection 36 on the hood 17.

By adjusting the nut 33, the tension of the spring 32 is made so that the weight of the trolley wire 2, the ear 12, eyelet bolt 13 and link 14 is sufficient to hold the end 20 against the pin 21 so that the complete circuit is established from the trolley wire 2 to the wire 8 under all normal conditions. After the trolley wheel 1 leaves the trolley pan 3 and while the car is about the switch-point, the upward pressure of the trolley wheel 1 is sufficient to raise the contact from the pin 21 because of the assistance given by the spring 32 whereby the circuit is opened from the trolley wire 2 to the wire 8. As long as this trolley switch is open it is impossible for the magnet of the relay 6 to operate and this makes the relay itself inoperative. Furthermore, the trolley pan 3 is also rendered dead so that a wheel passing thereunder can, under no circumstances, throw the switch one way or the other, and so cause an accident. After leaving the trolley pan 3, each of these respective trolley wheels will raise the wire 2 the same as above described so that the trolley switch will remain open and the circuit will be open through the wire 8 until after the last car has passed beyond the ear 12. This apparatus will work the same, whether the two cars that follow each other are hitched together or not. It is sufficient that they follow each other closely. If they do they must go in the same direction and cannot take different directions. If they are intended to go in different directions, the motorman of the second car must wait until the first car is clear of the switch-point, and the trolley wheel clear of the trolley switch, and then the trolley wire 2 is lowered to its normal position, and thereafter the trolley pan 3 is made alive again and the automatic switch will operate in the normal manner.

While I have shown and described one embodiment of my invention, it is obvious that it is not restricted thereto, but is broad enough to cover all structures that come within the scope of the annexed claims.

What I claim is,

1. In a device of the class described, a trolley wire, a double solenoid, means for energizing either coil of this double solenoid, which means is controlled by the motor current of a car, and mechanism for opening a circuit in said means when a trolley wheel is on a predetermined part of the trolley wire.

2. In a device of the class described, a double solenoid, means for energizing either coil of this double solenoid, which means is controlled by the motor current of a car, a trolley wire, and mechanism for opening a circuit in said means when said trolley wire is raised.

3. In a device of the class described, a double solenoid, mechanism for energizing either coil of this double solenoid, which mechanism is controlled by the motor current of a car, a trolley wire, and a switch between said mechanism and said trolley wire, so that the weight of the trolley wire normally will close said switch and the switch is opened when the wire is raised by a trolley wheel.

4. In a device of the class described, means for energizing either coil of a double solenoid, which mechanism is controlled by the motor current of a car, a trolley wire and a switch connecting said trolley wire and means, said switch being provided with a hood, a bell crank lever, a link, a coiled spring and suitable contacts.

5. In a device of the class described, means for energizing either coil of a double solenoid, said means controlled by the motor current of a car, a trolley wire, and a switch connecting said means and trolley wire, said switch being provided with a hood, a bell crank lever mounted in said hood, a spring connected with said bell crank lever, contacts a link engaging said bell crank lever, and connections between said link and trolley wire.

ROBERT V. CHEATHAM.

Witnesses:
MARY BUTLER,
NORA TUCKER.